United States Patent [19]
Rank et al.

[11] Patent Number: 5,765,290
[45] Date of Patent: Jun. 16, 1998

[54] ADAPTABLE TIP SENSOR

[75] Inventors: David Brian Rank, Waukesha, Wis.; Mark Lawrence Clymer, Mystic; Glenn Graves, Oakdale, both of Conn.

[73] Assignee: Harley-Davidson, Inc., Milwaukee, Wis.

[21] Appl. No.: 528,719

[22] Filed: Sep. 15, 1995

[51] Int. Cl.⁶ .................................. G01D 5/12; G01C 9/06
[52] U.S. Cl. ........................... 33/365; 33/368; 33/391; 33/396
[58] Field of Search ........................... 33/365, 366, 368, 33/391, 396; 116/215; 200/61.45 R, 61.52; 340/689

[56] References Cited

U.S. PATENT DOCUMENTS

| | | | |
|---|---|---|---|
| 2,205,544 | 6/1940 | Rylsky | 33/365 |
| 2,823,367 | 2/1958 | Huron | 340/689 |
| 4,450,353 | 5/1984 | Sjolund | 33/366 |
| 4,685,218 | 8/1987 | Wolf | 33/366 |
| 4,803,426 | 2/1989 | Odagawa et al. | 324/207 |
| 4,972,595 | 11/1990 | Shimamura et al. | 33/366 |
| 5,373,153 | 12/1994 | Cumberledge et al. | 33/366 |

*Primary Examiner*—Christopher W. Fulton
*Attorney, Agent, or Firm*—Michael, Best & Friedrich LLP

[57] ABSTRACT

An adaptable tip sensor is useful for detecting the angular tipping of an object relative to a selected frame of reference. The sensor comprises a case that defines a two dimensional straight sided V-groove in which a disk can roll. A sensing device detects the presence or absence of the disk within the apex of the V-groove. As long as the object does not tip to a predetermined angle, the disk remains in the V-groove apex, and the sensing device produces a first signal. If the object tips to the predetermined angle, the disk rolls out of the V-groove apex, and the sensing device produces a different signal. Fluid in the case damps spurious vibrations. A labyrinth and air bubble in the case enhance desired rolling of the disk when the predetermined tipping has occurred.

10 Claims, 2 Drawing Sheets

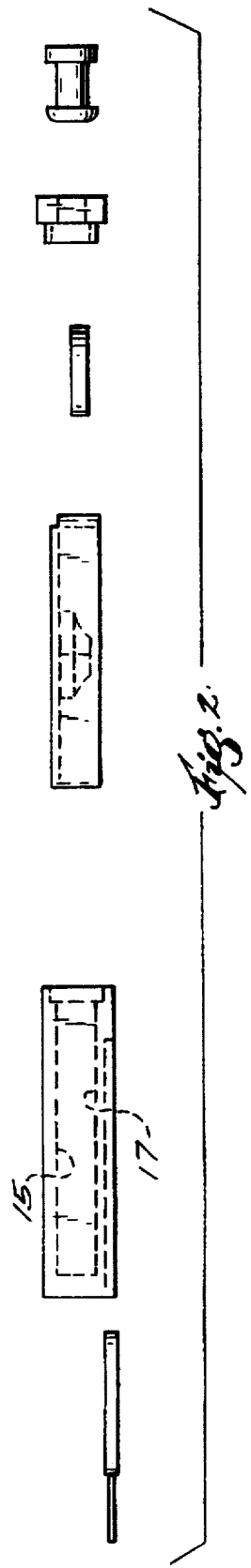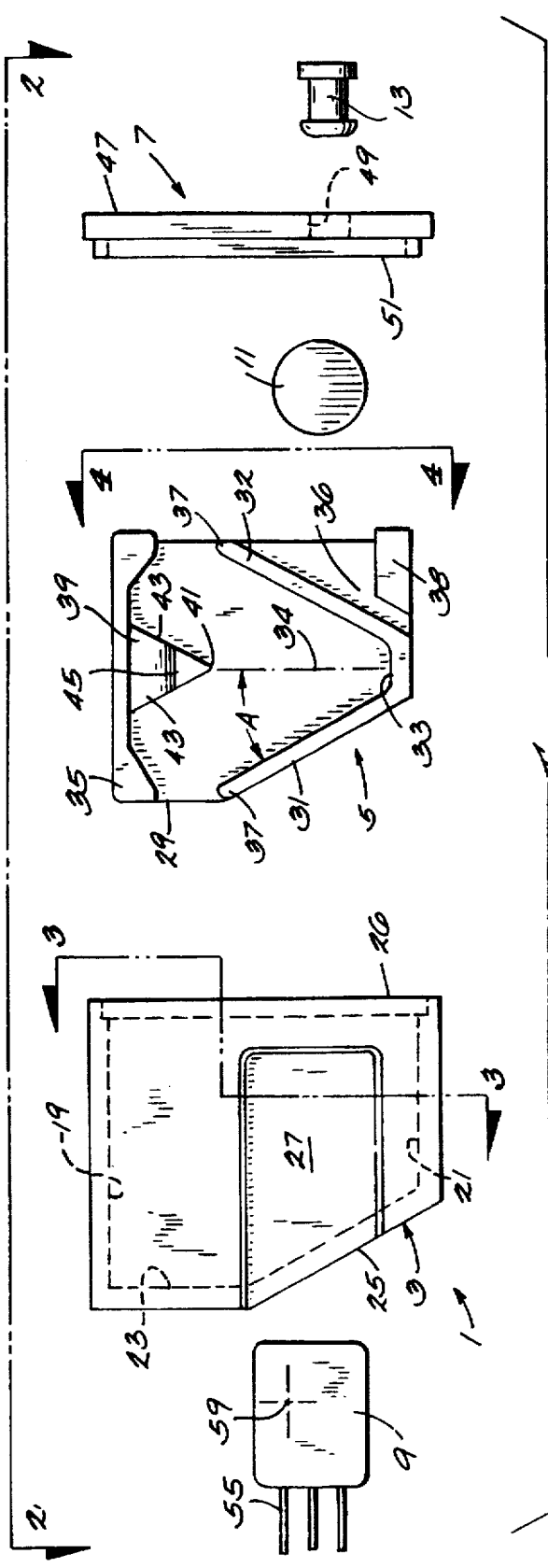

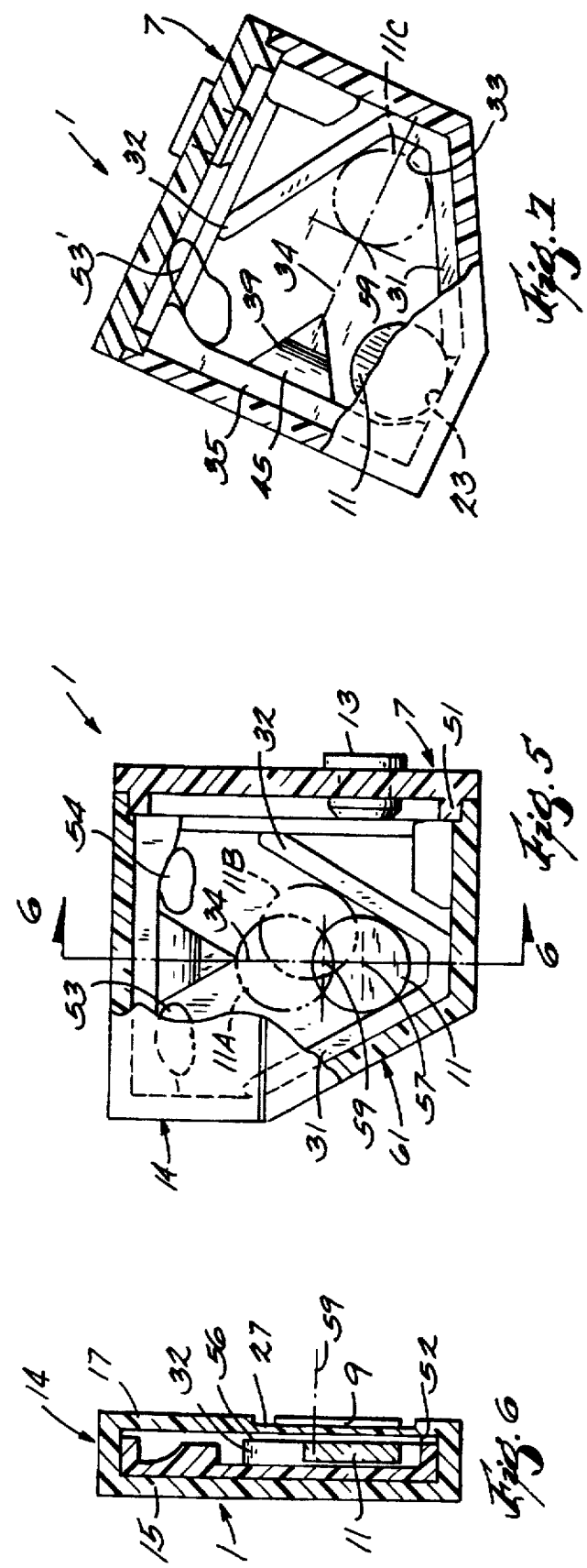

ADAPTABLE TIP SENSOR

BACKGROUND OF THE INVENTION

1. Field of the Invention

This invention pertains to inclination sensors, and more particularly to apparatus that senses the attitude of an object with respect to a selected frame of reference.

2. Description of the Prior Art

There are numerous occasions when it is important to monitor the angular relation of an object relative to a particular frame of reference. For example, it is highly desirable to know whether a motorcycle or other powered two-wheeled vehicle is upright or whether it has tipped over. If the vehicle has tipped over, its engine should be inoperative. Accordingly, it is known to incorporate a sensor into powered two-wheeled vehicles that detects whether a vehicle has tipped a predetermined amount with respect to the vertical. An example of such an inclination sensor may be seen in U.S. Pat. No. 4,972,595.

Another prior inclination sensor employed a pendulum that swung within a housing. The pendulum contained two spaced apart magnets. If the housing tilted sufficiently, one of the magnets approached an associated sensing device and caused it to actuate an appropriate electrical circuit.

Another prior inclination sensor included a metal sleeve that was slidable along an arcuate beam. As the beam tilted in space, the sleeve approached one of the beam ends, where it made electrical contact with an appropriate circuit.

The pendulum and slidable sleeve sensors were complicated and bulky. In addition, their reliability was suspect. Accordingly, there is a need for improvements in inclination sensors for vehicular use.

SUMMARY OF THE INVENTION

In accordance with the present invention, a compact adaptable tip sensor is provided that reliably detects the angular relation of an object relative to a selected frame of reference. This is accomplished by apparatus that includes a disk that rolls in a two dimensional straight sided V-groove.

The V-groove is part of a module that includes a case that may be partially filled with a damping fluid. The V-groove is partially bounded by two straight ramp walls joined to a side wall. The plane of the side wall is perpendicular to the planes of the ramp walls. The ramp walls converge at a predetermined angle to form the apex of the V-groove. The ramp and side walls are components of a V-block that further includes a top wall. The V-block top wall extends perpendicularly from the side wall and is spaced from free ends of the ramp walls opposite the V-groove apex.

Depending from the top wall of the V-block directly over the V-groove apex is a bumper. The bumper has two surfaces that are parallel to respective ramp walls and that are spaced from them a distance slightly greater than the diameter of the disk. The surfaces of the bumper converge to a point. The bumper prevents the disk from moving from one ramp wall to the other within the V-groove without first passing close to the apex. There is a cutout in the bumper near the V-block top wall.

The V-block is assembled in the case such that its side wall is proximate the back wall of the case. A front wall of the case is spaced from the longitudinal edges of the V-block ramp walls and is also spaced from the bumper. The case is closed with a cap. The damping fluid completes the adaptable tip sensor module. A quantity of air in the form of an air bubble remains within the case.

A sensing device, such as a Hall Effect sensing device, is located outside and adjacent the front wall of the case. The sensing device is located such that its target point intersects the disk for all positions of the disk between the V-groove apex and the bumper point. The sensing device is part of an electrical circuit that functions in accordance with the state of the sensing device.

In use, the adaptable tip sensor module is mounted to the object whose angular attitude relative to a selected frame of reference is to be monitored. For example, it may be desirable to monitor the tipping of an object relative to the vertical. In that case, the adaptable tip sensor is mounted to the object such that the V-groove apex points downwardly when the object is in an upright attitude. The sensing device operates to detect the presence of the disk within the V-groove apex and to produce an appropriate signal to the electrical circuit. As long as the object does not tip about a horizontal axis by an amount such that one of the V-block ramp walls becomes horizontal, the disk remains in the V-groove apex. The sensing device continues to detect the presence of the disk and control the electrical circuit accordingly.

However, if the object tips an amount that places a ramp wall horizontal, the disk will roll along that ramp wall away from the V-groove apex. The absence of the disk is detected by the sensing device, which actuates to control the electrical circuit in a different manner. When the object is returned to its upright attitude, the disk rolls back to the V-groove apex, where its presence is again detected by the sensing device.

The fluid within the module damps undesirable bouncing of the disk within the V-groove due to spurious vibrations acting on the object. On the other hand, when the object and module are tipped, the fluid flows readily through a labyrinth composed of the cutout in the V-block bumper and of the space between the V-block ramp walls and bumper and the case front wall. The air within the case creates a flushing action of the fluid as it flows in response to tipping of the object. The combination of the labyrinth and the air-induced flushing action of the fluid flow through the labyrinth enables responsive rolling of the disk when the object tips, even though the fluid damps unwanted disk movement due to vibrations.

The method and apparatus of the invention, using a module that includes a disk rollable in a straight sided V-groove, thus controls an electrical circuit in response to tipping of the module relative to a selected frame of reference. The adaptable tip sensor is optimized to damp transient vibrations acting on the disk while enhancing desired movement of the disk under tipped conditions.

Other advantages, benefits, and features of the present invention will become apparent to those skilled in the art upon reading the detailed description of the invention.

BRIEF DESCRIPTION OF THE DRAWINGS

FIG. 1 is an exploded view of the invention.

FIG. 2 is a view taken along line 2—2 of FIG. 1.

FIG. 3 is a cross sectional view taken along line 3—3 of FIG. 1.

FIG. 4 is a view taken along line 4—4 of FIG. 1.

FIG. 5 is a partially broken front view on an enlarged scale of the adaptable tip sensor in its assembled condition.

FIG. 6 is a cross sectional view taken along line 6—6 of FIG. 5.

FIG. 7 is a view similar to FIG. 5, but showing the adaptable tip sensor in a tipped attitude.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 1–4, an adaptable tip sensor 1 is illustrated that includes the present invention. The adaptable tip sensor 1 is particularly useful for determining the angular relation of an object relative to a selected frame of reference. For example, the adaptable tip sensor is capable of detecting whether the object is at a predetermined angular relation to the vertical, i.e., to the direction of gravity. However, it will be recognized that the invention is also suitable for use with non-gravity frames of reference.

In the preferred embodiment, the adaptable tip sensor 1 is comprised of six components: a case 3, V-block 5, cap 7, sensing device 9, disk 11, and plug 13. The case 3, V-block 5, cap 7, disk 11, and plug 13 are assemblable into a compact module 14 as shown in FIGS. 5 and 6.

The case 3 is fabricated from a non-ferrous material and has a back wall 15, a front wall 17, and a three-sided peripheral wall. The peripheral wall has a top section 19, a bottom section 21, and an end section 23. The end section 23 of the peripheral wall may have an angular portion 25. The case end 26 opposite the peripheral wall end section 23 is open. The case front wall 17 defines a shallow pocket 27. The depth of the pocket 27 is slightly greater than the thickness of the sensing device 9.

The V-block 5 is made from a non-ferrous material. It has a side wall 29 that defines a centerline 34. A pair of ramp walls 31, 32 are perpendicular to the side wall 29. The ramp walls 31, 32 converge symmetrically about the centerline 34 toward the bottom of the side wall to form an apex 33. The angle A of each ramp wall with the centerline 34 is governed by the particular application for the adaptable tip sensor 1. The angled portion 25 of the peripheral wall of the case 3 matches the angle A of the ramp wall 31. A top wall 35 is also perpendicular to the side wall. The free ends 37 of the ramp walls are spaced from the top wall 35. The width of the top wall is slightly less than the distance between the front and back walls 15 and 17, respectively, of the case. The ramp walls have a lesser width than the top wall.

Depending from the top wall 35 of the V-block 5 is a bumper 39. The bumper 39 is partially defined by surfaces 43 that are parallel to the ramp walls 31, 32. The surfaces 43 converge to a point 41 that lies on the centerline 34. The ramp walls and the bumper thus cooperate to form a two-dimensional V-groove having straight sides and the apex 33. The bumper has a cutout 41 adjacent the top wall.

The V-block side wall 29 has an area 36 that is outside of the V-groove. A spacer 38 having the same width as the top wall 35 extends from the area 36.

The cap 7 is made from a non-ferrous material and has an end plate 47 with a hole 49 therethrough. A flange 51 of the cap end plate 47 fits inside the open end 26 of the case 3. The plug 13 seals the cap hole 49. The plug is located near the area 36 of the V-block side wall 29. As illustrated, the plug is made from molded rubber. However, it will be appreciated that any of several types of plugs, such as a screw with a sealing washer, also would be satisfactory.

The sensing device 9 may be a proximity switch, as are well known. In that case a ferrous or other metallic disk 11 is acceptable. However, we prefer that the disk be a magnet so that a Hall Effect sensing device, also well known, can be used. The Hall Effect sensing device has electrical leads 55 and a target point 59.

The disk 11 is preferably cylindrical in shape. It is sized to fit loosely within the V-groove between the V-block ramp walls 31, 32 and the bumper surfaces 43.

The adaptable tip sensor module 14 is assembled by placing the disk 11 on the V-block side wall 29 proximate the apex 33. Then the V-block 5 is slid inside the open end 26 of the case 3. The V-block and case are designed such that the V-block can be inserted into the case with only one orientation to properly seat inside the case. As mentioned, the width of the V-block ramp walls 31, 32 and of the bumper 39 is less than the distance between the back and front walls 15 and 17, respectively, of the case 3. Accordingly, there is a space 52 between the longitudinal edges 56 of the ramp walls and the case front wall. The space 52 also exists between the bumper and the case front wall. The flange 51 of the cap 7 is inserted into the case open end, and the cap is resistance welded to the case. The disk is thus loosely captured for rolling in two dimensions within the V-groove.

The interior of the case is partially filled with a silicone oil. In some applications an oil may not be necessary or desirable. The particular viscosity of the oil is also dependent upon the application of the adaptable tip sensor 1. Specifically, the oil viscosity is tuned to minimize random bouncing of the disk 11 inside the V-groove while still allowing desired rolling of the disk along the ramp walls 31, 32, as will be explained shortly.

The case 3 is not completely filled with the silicone oil. Rather, an air space represented by two typical air bubbles 53, 54 remains inside the case. The plug 13 is inserted into the cap 7 after the correct amount of oil is in the case.

The module 14 of the adaptable tip sensor 1 is mounted to an object, not shown, whose angular relation to the selected frame of reference is to be monitored. For example, the adaptable tip sensor may be used with a motorcycle to detect whether it has tipped to a predetermined angle relative to the vertical. In that case, the module is mounted to the motorcycle such that the centerline 34 is vertical when the motorcycle is upright.

The sensing device 9 is also mounted to the motorcycle or other object. To maximize the strength of the sensing device signal, it is placed in the case pocket 27, which allows it to be as close as possible to the disk 11. The sensing device leads 55 are connected to an appropriate electrical circuit, such as the ignition control circuit of a motorcycle, not illustrated in the drawings.

It is a feature of the present invention that the target point 59 of the Hall Effect sensing device 9 does not coincide with the longitudinal axis 57 of the disk 11 when the disk is within the V-groove apex 33. Rather, the sensing device target point is located toward the bumper point 41 such that the target point intersects the disk for all positions of the disk longitudinal axis 57 along the centerline 34 between the apex and the bumper point. For example, if the disk is at the position 11A in FIG. 5, the target point still intersects the disk. Further, the target point intersects the disk for multiple disk positions, typically represented by reference numeral 11B, along the ramp walls 31, 32. As long as the sensing device target point intersects the disk, a first signal is produced for processing by the electrical circuit. The silicone oil damping fluid, the bumper points, and the sensing device target point cooperate to assure that any transient vibrations of the motorcycle or other object, and thus of the adaptable tip sensor 1, do not cause the disk to unintentionally move within the V-groove so as not to be detected by the sensing device.

On the other hand, if forces acting on the disk 11 are such that the resultant of forces acting on the disk cause it to move to the position of FIG. 7, the adaptable tip sensor 1 detects such tipping. In FIG. 7, the adaptable tip sensor has tipped about a horizontal axis such that the ramp wall 31 is past the horizontal. The disk 11 is then free to roll out of the V-groove apex 33 and along the ramp wall 31. When that occurs, the sensing device target point 59 no longer intersects the disk and a second signal is sent by the sensing device to the electrical circuit.

The disk 11 rolls along the V-groove until it strikes the end section 23 of the case peripheral wall. If the motorcycle tips in the opposite direction from that of FIG. 7, the disk rolls along the ramp wall 32 until it strikes the cap 7. Using the case end section and the cap as the limits for the rolling disk enables a maximum amount of disk movement within the V-groove. The location of the cap plug 13 in the region of the area 36 of the V-block side wall 29 precludes the possibility that the plug will interfere with the rolling of the disk.

As the adaptable tip sensor 1 undergoes tipping, the damping oil flows through a labyrinth composed of the space 52 between the V-block ramp walls 31, 32 and the case front wall 17, of the space between the bumper 39 and the case front wall, and of the cutout 45 in the bumper. The labyrinth enables the fluid to start flowing as soon as the adaptable tip sensor undergoes its tipping motion. Simultaneously, the air bubbles 53, 54 change their positions within the case. They flow from against the V-block top wall 35 to become merged against the cap 7 as shown at reference numeral 53'. The bubble 53 flows through the cutout 45 in the bumper 39. The air bubbles create a flushing action of the silicone oil that enhances the oil flow through the labyrinth and thus the rolling of the disk 11.

When the motorcycle or other object undergoes a reverse angular motion such that it returns to the upright attitude of FIG. 5, the disk 11 rolls back to the V-groove apex 33. Upon that occurrence, the sensing device target point 59 again intersects the disk and produces the first signal for the electrical circuit.

In motorcycle or other two wheeled vehicle applications, the motorcycle occasionally rounds a corner. When that occurs, the normal acceleration force acting on the motorcycle and the adaptable tip sensor 1 becomes larger than the contribution of force due to gravity. That situation is represented by the position of the disk 11C in FIG. 7. The inertia of the disk keeps it within the V-groove apex 33 despite the tipping of the motorcycle and the adaptable tip sensor relative to the vertical.

In summary, the results and advantages of a variety of objects, such as motorcycles and other powered two-wheeled vehicles, can now be more fully realized. The adaptable tip sensor 1 provides a tip sensing feature that is not influenced by random vibrations imparted to it during normal operations of the motorcycle. This desirable result comes from using the combined functions of the V-block 5. The bumper 39 of the V-block serves to limit motion of the disk 11 away from the V-groove apex 33 during normal operation. The bumper cooperates with the damping oil and the sensing device 9, which is carefully located relative to the V-block apex and the bumper, to assure that spurious movements of the disk do not actuate the sensing device.

The V-block bumper and ramp walls 31, 32 cooperate with the case 3 to form a labyrinth that enables the damping fluid to flow and the disk to roll immediately when the motorcycle is tipped. The air bubbles in the damping fluid create a flushing motion of the fluid through the labyrinth that enhances fluid flow and rolling of the disk.

It will also be recognized that in addition to the superior performance of the adaptable tip sensor 1, its construction is such as to be of modest cost. Also, since the design is made of simple and rugged components, the need for maintenance is negligible.

Thus, it is apparent that there has been provided, in accordance with the invention, an adaptable tip sensor that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An adaptable tip sensor for detecting tipping relative to a vertical frame of reference comprising:

a. a module comprising:
  i. case means for defining a two dimensional V-groove having straight sides, an apex, and a vertical centerline, wherein the case means comprises:
   a case having front, back, and peripheral walls, and an open end;
   a V-block inside the case, the V-block comprising:
    a side wall adjacent the case back wall and defining the vertical centerline;
    a pair of straight ramp walls joined to the side wall symmetrically about the vertical centerline;
    a top wall; and
    bumper means depending from the top wall for cooperating with the V-block side and ramp walls and with the case front wall to define the V-groove, the bumper means comprising a point located at a predetermined distance from the apex of the V-groove and coincident with the V-groove centerline; and
   cap means for closing the case open end;
  ii. disk means for rolling within the case means V-groove; and
  iii. fluid means for damping spurious movements of the disk means within the case means V-groove; and
 b. sensing means for detecting the absence or presence of the disk means proximate the apex of the case means V-groove, the sensing means comprising a magnetic sensing device outside the case front wall and having a target point that intersects the disk at all positions thereof along the V-groove centerline between the V-groove apex and the bumper means point, the magnetic sensing device target point non-intersecting the disk when the disk rolls out of the V-groove apex;
 so that the disk means is at the V-groove apex and the sensor means detects the presence of the disk means when the V-groove centerline is vertical, and the disk means rolls out of the V-groove apex and the sensor means detects the absence of the disk means when the case means tips about a horizontal axis through a predetermined angle.

2. The adaptable tip sensor of claim 1 wherein:

a. the ramp walls of the V-block have respective free ends that are spaced from the V-block top wall; and b. the case peripheral wall and the cap means limit rolling of the disk means within the V-groove away from the apex thereof.

3. The adaptable tip sensor of claim 1 wherein:

a. the V-block bumper means defines a cutout adjacent the top wall; and b. the V-block bumper means and ramp walls are spaced from the front wall of the case, so that the fluid means flows through the bumper means cutout and through the space between the bumper means ramp walls and the case front wall when the case tips about the horizontal axis.

4. The adaptable tip sensor of claim 3 wherein an air bubble is trapped in the case with the fluid means, the air bubble flowing through the cutout in the V-block bumper means and through the space between the V-block ramp walls and the case front wall, and thereby creating a flushing action of the fluid means within the case when the case tips about the horizontal axis.

5. Apparatus for detecting tipping of an object to a predetermined angle relative to a selected frame of reference comprising:

a. a disk;

b. case means mounted to the object for capturing the disk in a two dimensional V-groove having straight sides and an apex, the case means comprising a case having a front wall, the front wall having a pocket therein proximate the V-groove apex; and c. sensor means mounted to the object for detecting the presence of the disk proximate the V-groove apex, the sensing means being mounted to the object within the case pocket, so that the case means tips with the object and the sensing means detects the absence of the disk when the object tips through the predetermined angle such that the disk rolls out of the V-groove apex.

6. The apparatus of claim 5 wherein:

a. the case means V-qroove is defined by a pair of straight ramp walls that converge to form the apex, and by a bumper having a pair of straight surfaces spaced from and parallel to the respective ramp walls, the bumper side surfaces converging to a point located a predetermined distance from the V-qroove apex;

b. the case means comprises a case having a front wall; and c. the ramp walls and the bumper are joined to a side wall of a V-block, the V-block being inserted into the case, the case front wall cooperating with the V-block side and ramp walls and the bumper to capture the disk in the V-groove.

7. The apparatus of claim 6 wherein:

a. the case means is at least partially filled with a damping fluid; and b. the case means defines a labyrinth comprised of a cutout in the bumper, first spaces between the ramp walls and the case front wall, and a second space between the bumper and the case front wall through which the damping fluid flows when the case means is tipped to the predetermined angle to thereby enable the fluid to flow and the disk to roll as soon as the object tips through the predetermined angle.

8. The apparatus of claim 6 wherein:

a. the V-block side wall has an area that is outside of the V-groove; and b. the case means comprises a cap having a plug located proximate the area of the V-block back wall that is outside of the V-groove, so that the cap plug does not interfere with the rolling of the disk in the V-groove.

9. The apparatus of claim 6 wherein:

a. the V-block ramp walls and the bumper are spaced from the case front wall;

b. the case means is partially filled with a damping fluid and a predetermined quantity of air remains in the case means;

c. the damping fluid flows between the ramp walls and bumper and the case front wall in response to tipping of the object; and d. the air in the case means creates a flushing action in response to tipping of the object to enhance flowing of the damping fluid.

10. The apparatus of claim 9 wherein the bumper has a cutout therein through which air flows to enhance the flushing action in response to tipping of the object.

* * * * *